(12) United States Patent
Janson

(10) Patent No.: US 6,997,298 B2
(45) Date of Patent: Feb. 14, 2006

(54) DUAL CLUTCH ASSEMBLY FOR A MOTOR VEHICLE POWERTRAIN

(75) Inventor: David Janson, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/846,307

(22) Filed: May 14, 2004

(65) Prior Publication Data

US 2005/0252749 A1 Nov. 17, 2005

(51) Int. Cl.
F16D 21/02 (2006.01)

(52) U.S. Cl. ................. 192/48.91; 192/70.17; 192/112; 192/212

(58) Field of Classification Search ............ 192/48.2, 192/48.8, 48.9, 48.91, 70.17, 99 A, 212, 192/112, 115
See application file for complete search history.

(56) References Cited

U.S. PATENT DOCUMENTS

| | | | |
|---|---|---|---|
| 2,523,501 A * | 9/1950 | Davies et al. ............ 192/70.28 |
| 3,185,274 A | 5/1965 | Maurice | |
| 4,026,400 A | 5/1977 | Rawlings | |
| 4,214,653 A | 7/1980 | Slack | |
| 4,236,620 A | 12/1980 | Beccaris | |
| 4,440,281 A | 4/1984 | Hauguth | |
| 4,463,621 A | 8/1984 | Fisher | |
| 6,463,821 B1 | 10/2002 | Reed, Jr. et al. | |
| 6,634,477 B1 * | 10/2003 | Beneton et al. ............ 192/48.8 |
| 6,668,994 B1 * | 12/2003 | Hirt ........................ 192/48.8 |
| 6,698,562 B1 | 3/2004 | Teraoka et al. | |
| 6,722,483 B1 | 4/2004 | Damm et al. | |
| 6,830,139 B1 * | 12/2004 | Carlson et al. ............ 192/48.8 |
| 6,857,513 B1 * | 2/2005 | Tornatore et al. ........ 192/48.91 |
| 2002/0060118 A1 | 5/2002 | Beneton et al. | |
| 2003/0024788 A1 | 2/2003 | Damm et al. | |
| 2003/0066728 A1 | 4/2003 | Hirt | |
| 2003/0066730 A1 | 4/2003 | Zink et al. | |
| 2003/0075412 A1 | 4/2003 | Heiartz et al. | |
| 2003/0079953 A1 | 5/2003 | Carlson et al. | |
| 2003/0085093 A1 | 5/2003 | Heiartz et al. | |
| 2003/0106767 A1 | 6/2003 | Beneton et al. | |
| 2003/0164274 A1 | 9/2003 | Feldhaus et al. | |
| 2003/0164275 A1 | 9/2003 | Feldhaus et al. | |

* cited by examiner

Primary Examiner—Saul Rodriguez
(74) Attorney, Agent, or Firm—David B. Kelley; MacMillan, Sobanski & Todd

(57) ABSTRACT

A powertrain for transmitting torque between a power source and a transmission includes an output shaft driven by the power source, first and second input shafts, a housing, a first flywheel rotatably supported on the housing, a second flywheel rotatably supported on the output shaft and driveably connected to the first flywheel, a first clutch for driveably connecting and disconnecting the first flywheel and the first input shaft, and a second clutch for driveably connecting and disconnecting the second flywheel and the second input shaft.

14 Claims, 1 Drawing Sheet

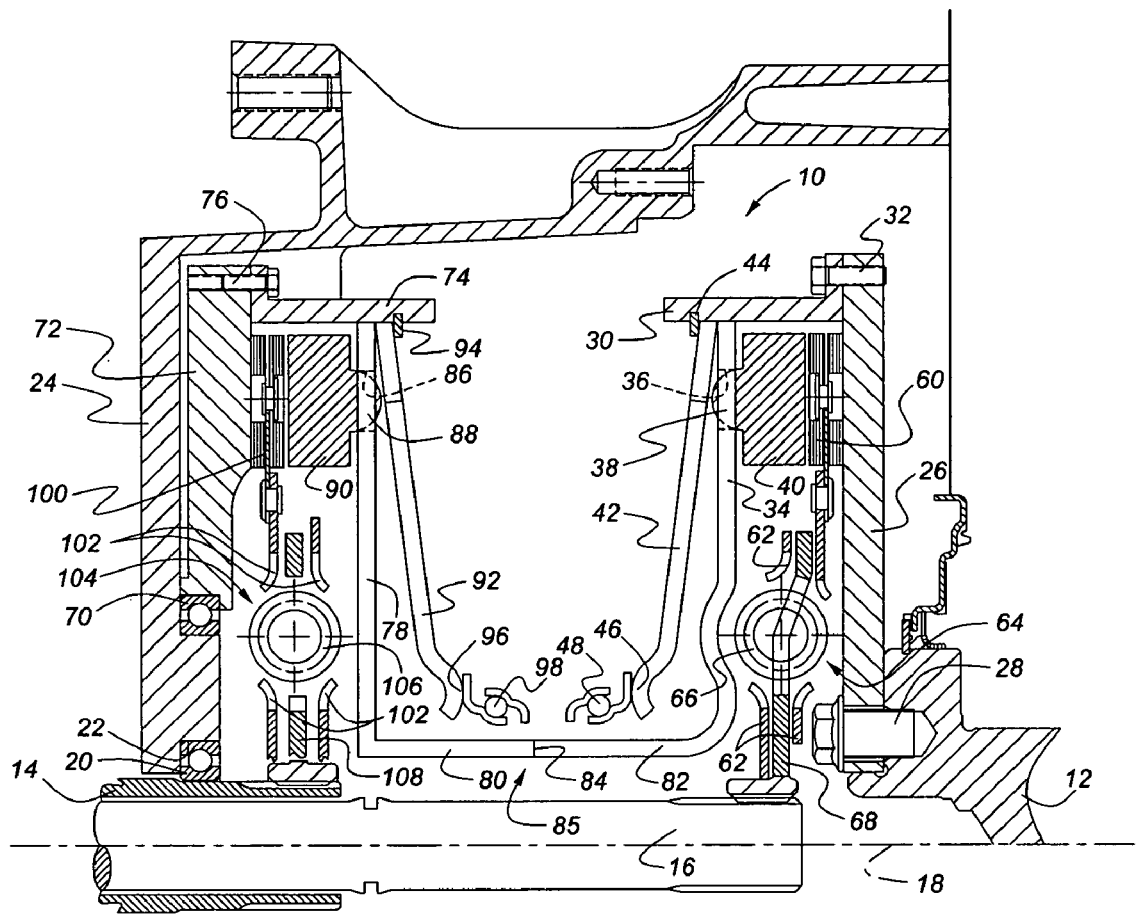

DUAL CLUTCH ASSEMBLY FOR A MOTOR VEHICLE POWERTRAIN

BACKGROUND OF THE INVENTION

1. Field of the Invention

The invention relates to friction clutches. In particular the invention pertains to dual friction clutches for connecting a power source output shaft alternately to input shafts of a motor vehicle transmission.

2. Description of the Prior Art

Conventional automotive dry clutch systems are supported directly on the engine crankshaft distant from the center of mass of the system. The mass of the clutch system is cantilevered and subject to bending displacement relative to the centerline of the crankshaft. As the crankshaft rotates, the mass of the clutch system is subject to orbiting motion about the true centerline of the crankshaft. The resulting orbiting radius from the crankshaft axis and the clutch mass together induce a first order forced vibration in the powertrain, which further increases crankshaft deflection and increases load on the system.

Misalignment of the engine crankshaft centerline relative to the transmission input shaft centerline can cause the surfaces of the friction discs of the clutch to wear irregularly in compliance with the misalignment. Misalignment of the clutch mass relative to the crankshaft during initial installation also contributes to the problem.

U.S. Publication US2003/0066730, dated Apr. 10, 2003, describes an example of a clutch assembly installed between a drive unit and a transmission having a transmission input shaft to transmit torque between the drive unit and the transmission. The clutch and a portion of the clutch actuation system hardware are supported on an engine crankshaft. The clutch mass is cantilevered a substantial distance from the crankshaft support across a space occupied by the clutch and its actuators.

Automotive torque converter systems conventionally are secured to the engine crankshaft with a compliant or flexible member, which allows axial and bending displacement, and are supported on the transmission by a single bushing or bearing. The partially supported cantilevered mass of the torque converter, due to bending or flexing and whirl of the crankshaft rotates in an orbiting motion about the true centerline of the crankshaft. The resulting orbit radius and torque converter mass induce a first order vibration in the powertrain, which increases the crankshaft deflection and resulting loads. But misalignment of the engine crankshaft centerline relative to the transmission input shaft centerline is accommodated by compliance within a compliant, flexible member located in a torque-transmitting path between the crankshaft and torque converter. Misalignment of the torque converter mass relative to the crankshaft during installation and misalignment of the transmission support relative to the engine crankshaft centerline contribute to the vibration.

Instead, a powertrain assembly for transmitting torque from an engine to two transmission input shafts may include two flywheels, each associated with one of the input clutches. In this case, there is need to support one of the clutches and the corresponding flywheel on the engine crankshaft. The other clutch and its corresponding flywheel can be supported on the transmission housing. This arrangement would eliminate transient effects that induce vibrations caused by misalignment of the crankshaft axis and the axis of rotation that is supported on the transmission housing. This structural arrangement would eliminate entirely the cantilevered support currently provided to the clutch masses.

SUMMARY OF THE INVENTION

A powertrain assembly according to this invention for transmitting torque between a power source and a transmission includes an output shaft driven by the power source, first and second input shafts, a housing, a first flywheel rotatably supported on the housing, a second flywheel rotatably supported on the output shaft and driveably connected to the first flywheel, a first clutch for driveably connecting and disconnecting the first flywheel and the first input shaft, and a second clutch for driveably connecting and disconnecting the second flywheel and the second input shaft.

In a powertrain of this invention, the flywheels continually rotate at the same speed due to their mutual drive connection, and the pressure plates of each clutch continually rotate at the same speed because they are driveably connected to the respective flywheels.

In the clutch assembly according to this invention, the entire mass of each clutch is fully supported by bearings mounted either on the transmission housing or on the engine block. This mounting technique provides a stable support for the clutch system free from the effects of crankshaft whirl and misalignment of the crankshaft relative to the transmission. Powertrain noise, vibration and harshness are improved due to the elimination of first order imbalance forces.

Engine power is transmitted through a flexible coupling that allows for radial and angular misalignment of the engine crankshaft axis relative to the axis on the transmission housing.

Various objects and advantages of this invention will become apparent to those skilled in the art from the following detailed description of the preferred embodiment, when read in light of the accompanying drawings.

BRIEF DESCRIPTION OF THE DRAWINGS

The FIGURE is a side elevation view, partially in cross section, showing a dual dry clutch assembly arranged in a torsion transmitting path between an engine crankshaft and two transmission input shafts.

DETAILED DESCRIPTION OF THE PREFERRED EMBODIMENT

Referring now to the FIGURE, there is illustrated a dual clutch assembly 10 for transmitting power between an engine crankshaft 12, and first and second transmission input shafts 14, 16, alternately. Shaft 12 may be an output shaft driven by an electric motor or hydraulic motor. Input shaft 14 is a sleeve shaft. Input shaft 16 is a solid shaft coaxial with shaft 12 and located within the sleeve shaft along at least a portion of its length. The input shafts are driveably connected to gearing that produces various ratios of the speed of a transmission output shaft and the speed of the input shafts. The dual clutch assembly, input shafts 14, 16 and crankshaft 12 are arranged about a longitudinal axis 18.

The crankshaft 12 is supported for rotation on bearings (not shown) located in the engine block. The input shafts 14, 16 are rotatably supported on a clutch support bearing 20, which is pressed into a recess 22 formed in a transmission case 24, in which the gearing, shafts, synchronizers and other control elements of the transmission are located. The transmission 24 and engine block are supported on the chassis of the vehicle.

The crankshaft 12 supports a flywheel 26, which is secured to the crankshaft at a bolted connection 28, and a pressure plate cover 30 is secured to the flywheel 26 near its outer periphery by a bolted connection 32. A speed synchronizing disc 34, located in a radial plane, is secured to the pressure plate cover 30, preferably by a weld. Disc 34 is formed with openings 36, spaced angularly about axis 18 and sized to receive projections 38 formed on the adjacent axial face of a pressure plate 40. The pressure plate cover 30 is rotatably connected to pressure plate 40 by drive links or drive straps (not shown), which permit axial displacement of the pressure plate relative to the cover, but require the cover and pressure plate to rotate as a unit. The drive links or drive straps are of the type conventionally used for this purpose in a dual clutch assembly for a motor vehicle powertrain. The projections 38 extend through the openings 36 and into contact with the adjacent axial surface of a clutch apply lever 42. The radially outer periphery of the clutch apply lever 42 is located in a space between a snap ring 44, which is secured to pressure plate cover 30 and the disc 34. The snap ring 44 and disc 34 secure lever 42 to the pressure plate cover 30 against relative axial displacement.

A bead 46, formed at the radially inner periphery of the clutch apply lever 42, is held in resilient contact with a throw-out bearing 48. Preferably, lever 42 is a Belleville spring, which develops preloaded contact with bearing 48 upon installation, such that the lever and bearing are maintained in continual mutual contact during service.

A first clutch, which preferably includes a clutch disc 60 but may include a stack of thin clutch discs located in an space between the flywheel 26 and pressure plate 40, is driveably connected to a housing 62 of a torsion damper 64 containing helical coiled compression springs 66, which are arranged in a annular space around axis 18 surrounded by the housing 62. A radially directed damper plate 68, secured by splines to input shaft 16, extends radially into a space between adjacent damper springs 66, and is located close to an end of each adjacent spring. Torsional displacement of the clutch disc 60 relative to input shaft 16 causes the housing 62 and springs 66 to rotate relative to the plate 68. The springs contact the damper plates, are compressed due to this contact, and frictionally engage the damper housing 62 as they compress. In this way, the damper 64 stores torsional energy in the springs and dissipates, through friction, some of the torsional energy transmitted between the clutch disc 60 and input shaft 16. Torsion damper 64 driveable connects clutch disc 60 and input shaft 16, and attenuates torsional vibrations between those components.

A bearing 70 supports a second flywheel 72 for rotation on the transmission case 24. Near its radially outer periphery, flywheel 72 is secured to a pressure plate cover 74 by a bolted connection 76. A drive disc 78, located in a radial plane, is secured to the pressure plate cover 74, preferably by a weld. Disc 78 has an axial leg 80, and disc 34 has an axial leg 82, the legs being permanently connected by a butt weld 84 or releasably connected by a spline joint, such that the discs 78 and 34 form a unitary drive coupling 85 having a channel cross section. Disc 78 is formed with openings 86, spaced angularly about axis 18 and sized to receive projections 88 formed on the adjacent axial face of a pressure plate 90. The pressure plate cover 74 is rotatably connected to pressure plate 90 by drive straps, which permits axial displacement of the pressure plate relative to the cover, but requires the cover and pressure plate to rotate as a unit. The projections 88 extend through the openings 86 and into contact with the adjacent axial surface of a clutch apply lever 92. The radially outer periphery of the clutch apply lever 92 is located in a space between a snap ring 94, which is secured to pressure plate cover 74 and the disc 78. The snap ring 94 and disc 78 secure lever 92 to the pressure plate cover 74 against relative axial displacement.

A bead 96, formed at the radially inner periphery of the clutch apply lever 92, is held in resilient contact with a throw-out bearing 98. Preferably, lever 92 is a Belleville spring, which develops preloaded contact with bearing 98 upon installation, such that the lever and bearing are maintained in continual mutual contact during service.

A second clutch, which includes a clutch disc 100 located in an space between the flywheel 72 and pressure plate 90, is driveably connect to a housing 102 of a torsion damper 104 containing helical coiled compression springs 106, which are arranged in a annular space around axis 18 surrounded by the housing 102. Radially directed damper plates 108, secured by a spline to input shaft 14, extend radially into a space between adjacent damper springs 106. The torsion damper 104 driveable connects clutch disc 100 and input shaft 14, and attenuates torsional vibrations between those components.

Preferably the throw-out bearings 48, 98 are electromechanically actuated to apply and release alternately the first and second clutches.

In operation, clutch disc 60 is engaged by applying an actuating force to throw-out bearing 48 that has an axial component directed rightward. Bearing 48 applies to clutch apply lever 42 at bead 46 an axial force directed rightward. A leftward reaction to the actuating force is developed at the snap ring 44 and pressure plate cover 30. A rightward force is applied by clutch apply lever 42 to protrusions 38 on the pressure plate 40, thereby forcing the clutch disc 60 into frictional engagement with flywheel 26 and the pressure plate 40. The damper 64 completes a torsion path between the crankshaft 12 and input shaft 16 through the clutch disc 60 and flywheel 26. When the actuating force is removed from throw-out bearing 48, frictional engagement of the clutch disc 60 with the flywheel 26 and pressure plate 40 is discontinued, and the clutch disengages due to the resilient displacement of the clutch apply lever 42.

The clutch disc 100 is engaged by applying an actuating force to throw-out bearing 98 having an axial component directed leftward. Bearing 98 applies to clutch apply lever 92 at bead 96 an axial force directed leftward. A rightward reaction force to the actuating force is developed at the snap ring 94 and pressure plate cover 74. A leftward force is applied by clutch apply lever 42 to protrusions 88 on the pressure plate 90, thereby forcing the clutch disc 100 into frictional engagement with flywheel 72 and the pressure plate 90. The damper 104 completes a torsional path between the crankshaft 12 and input shaft 14 through the torque path that includes clutch disc 100, flywheel 72, pressure plate cover 74, drive coupling 85, pressure plate cover 30, and flywheel 26. When the actuating force is removed from throw-out bearing 98, frictional engagement of the clutch disc 100 with the flywheel 72 and pressure plate 90 is discontinued, and the clutch disengages due to the resilient displacement of the clutch apply lever 92.

Each clutch is disengaged by removing the actuating force from its corresponding throw-out bearing 48, 98. The clutch apply levers 42, 92 are formed of Belleville springs, which deflect and develop a resilient elastic force when the actuating forces are applied to the bearings 48, 98. When the actuating forces are removed, the clutch apply levers 42, 92 are released and return immediately to the neutral, nonactuated positions of the FIGURE, allowing the respective clutch to disengage.

A transmission, whose input shafts are driveably connected by the clutches, may be a transmission having multiple layshafts or countershafts, each associated with an alternate speed ratio produced by the transmission. To produce each speed ratio, a synchronizer or coupler prepares a drive path associated with the oncoming speed ratio, one input clutch is disengaged, the other input clutch is engaged, and a synchronizer decouples the offgoing speed ratio. A transmission of this type is described in U.S. Pat. No. 4,463,621, dated Aug. 7, 1984, which is assigned to the Assignee of the present invention. The entire disclosure of U.S. Pat. No. 4,463,621 is incorporated herein by reference.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. Apparatus for transmitting torque between a power source and a powertrain component comprising:
   an output shaft driven by the power source;
   a first input shaft of the component;
   a second input shaft of the component;
   a housing;
   a first flywheel rotatably supported on the housing;
   a second flywheel rotatably supported on the output shaft and spaced axially from the first flywheel;
   a first clutch for driveably connecting and disconnecting the first flywheel and the first input shaft;
   a second clutch for driveably connecting and disconnecting the second flywheel and the second input shaft;
   a mechanism for actuating one of the first clutch and second clutch;
   a coupling including a web located between the first flywheel and the second flywheel and extending axially, a first leg extending radially outward from the web and driveably connected to the first flywheel, a second leg spaced axially from the first leg, extending radially outward from the web and driveably connected to the second flywheel, the legs and web at least partially enclosing a space between the first clutch and the second clutch, said mechanism being located within said space.

2. The apparatus of claim 1, wherein the first clutch further comprises:
   a pressure plate supported for displacement relative to the first flywheel; and
   a clutch disc located between the first flywheel and the pressure plate, for frictionally engaging and disengaging the first flywheel and the pressure plate in response to displacement of the pressure plate.

3. The apparatus of claim 1, wherein:
   the first clutch further comprises a pressure plate supported for displacement relative to the first flywheel, and a clutch disc located between the first flywheel and the pressure plate, for frictionally engaging and disengaging the first flywheel and the pressure plate response to displacement of the pressure plate; and
   the second clutch further comprises a second pressure plate supported for displacement relative to the second flywheel, and a clutch disc located between the second flywheel and the second pressure plate, for frictionally engaging and disengaging the second flywheel and the second pressure plate in response to displacement of the second pressure plate.

4. The apparatus of claim 1, wherein the first clutch further comprises:
   a pressure plate supported for displacement relative to the first flywheel; and
   a clutch disc located between the first flywheel and the pressure plate for frictionally engaging and disengaging the first flywheel and the pressure plate in response to displacement of the pressure plate; and
   the mechanism further comprises:
   a throw-out bearing for applying an actuating force; and
   a clutch apply lever contacting the throw-out bearing, and pivotably supported for movement into engagement with the pressure plate in response to die actuating force.

5. The apparatus of claim 1, wherein the first clutch further comprises:
   a pressure plate supported for displacement relative to the first flywheel including a protrusion; and
   a first clutch disc located between the first flywheel and the pressure plate for frictionally engaging and disengaging the first flywheel and the pressure plate in response to displacement of the first pressure plate; and
   the mechanism further comprises:
   a throw-out bearing for applying an actuating force that displaces the pressure plate;
   a clutch apply lever pivotably supported for movement into engagement with the pressure plate in response to the actuating force and for resilient disengagement from the pressure plate upon release of the actuating force;
   the coupling having an opening that provides access of the protrusion to the clutch apply lever.

6. The apparatus of claim 1, wherein:
   the first input shaft is coaxial with the second input shaft; and
   the first and second the input shafts are rotatably supported on the housing.

7. The apparatus of claim 1, further comprising:
   a first torsion damper driveably connected to the first input shaft and the first clutch; and
   a second torsion damper driveably connected to the second input shaft and the second clutch.

8. A powertrain for transmitting rotary power torque between a power source and a transmission, comprising:
   an output shaft driven by the power source;
   a first transmission input shaft;
   a second transmission input shaft;
   a transmission housing;
   a first flywheel rotatably supported on the transmission housing;
   a second flywheel rotatably supported on the output shaft and spaced axially from the first flywheel;
   a first clutch for driveably connecting and disconnecting the first flywheel and the first input shaft;
   a second clutch for driveably connecting and disconnecting the second flywheel and the second input shaft;
   a mechanism for actuating the first clutch and second clutch; and
   a coupling including a web located between the first flywheel and the second flywheel and extending axially, a first leg extending radially outward from the web and driveably connected to the first flywheel, a second leg extending radially outward from the web and driveably connected to the second flywheel, the radial legs and web at least partially enclosing a space between the first clutch and the second clutch, said mechanism being located within said space, said space being closed by the web over an axial length at a radial inner location and being open over an axial length between the legs at a radially outer location.

9. The powertrain of claim 8, wherein:

the first clutch further comprises a first pressure plate supported for displacement relative to the first flywheel, and a first clutch disc located between the first flywheel and the first pressure plate, for frictionally engaging and disengaging the first flywheel and the first pressure plate in response to displacement of the first pressure plate.

10. The powertrain of claim 8, wherein:

the first clutch further comprises a first pressure plate supported for displacement relative to the first flywheel, and a first clutch disc located between the first flywheel and the first pressure plate, for frictionally engaging and disengaging the first flywheel and the first pressure plate in response to displacement of the first pressure plate; and the second clutch further comprises a second pressure plate supported for displacement relative to the second flywheel, and a second clutch disc located between the second flywheel and the second pressure plate, for frictionally engaging and disengaging the second flywheel and the second pressure plate in response to displacement of the second pressure plate.

11. The powertrain of claim 8, wherein the first clutch further comprises:

a first pressure plate supported for displacement relative to the first flywheel; and a first clutch disc located between the first flywheel and the first pressure plate for frictionally engaging and disengaging the first flywheel and the first pressure plate in response to displacement of the first pressure plate; and the mechanism further comprises:

first and second a throw-out bearings, each bearing for applying an actuating force; and a first clutch apply lever contacting the first throw-out bearing, pivotably supported for movement into engagement with the first pressure plate in response to the actuating force.

12. The powertrain of claim 8, wherein:

the first clutch further comprises a first pressure plate supported for displacement relative to the first flywheel, including a first protrusion, and a first clutch disc located between the first flywheel and the first pressure plate for frictionally engaging and disengaging the first flywheel and the first pressure plate in response to displacement of the first pressure plate;

the second clutch further comprises a second pressure plate supported for displacement relative to the second flywheel including a second protrusion, and a second clutch disc located between the second flywheel and the second pressure plate for frictionally engaging and disengaging the second flywheel and the second pressure plate in response to displacement of the second pressure plate; and the mechanism further comprises first and second throw-out bearings for applying first and second actuating forces that displace the first and second pressure plates, respectively;

a first clutch apply lever pivotably supported for movement into engagement with the first pressure plate in response to the first actuating force and for resilient disengagement from the first pressure plate upon release of the first actuating force;

a second clutch apply lever pivotably supported for movement into engagement with the second pressure plate in response to the second actuating force and for resilient disengagement from the second pressure plate upon release of the second actuating force; and the coupling has a first opening that provides access of the first protrusion to the first clutch apply lever, and a second opening that provides access of the second protrusion to the second clutch apply lever.

13. The powertrain of claim 8, wherein:

the first input shaft is coaxial with the second input shaft; and the first and second the input shafts are rotatably supported on the housing.

14. The powertrain of claim 8, further comprising:

a first torsion damper driveably connected to the first input shaft and the first clutch; and a second torsion damper driveably connected to the second input shaft and the second clutch.

* * * * *